United States Patent [19]
Mori

[11] Patent Number: 4,709,981
[45] Date of Patent: Dec. 1, 1987

[54] CONNECTING STRUCTURE FOR CONNECTING OPTICAL CONDUCTORS

[76] Inventor: Kei Mori, 3-16-3-501, Kaminoge, Setagaya-ku, Tokyo, Japan

[21] Appl. No.: 706,548

[22] Filed: Feb. 28, 1985

[30] Foreign Application Priority Data

Mar. 5, 1984 [JP] Japan .................. 59-41848

[51] Int. Cl.⁴ ............................................. G02B 6/38
[52] U.S. Cl. .............................. 350/96.21; 350/96.10; 350/96.15; 350/96.22
[58] Field of Search ............... 350/96.20, 96.21, 96.22, 350/96.15, 96.10, 96.24

[56] References Cited

U.S. PATENT DOCUMENTS

| | | | |
|---|---|---|---|
| 3,455,625 | 7/1969 | Brumley et al. | 350/96.22 |
| 3,825,320 | 7/1974 | Redfern | 350/96.22 |
| 3,870,395 | 3/1975 | Schicketanz | 350/96.21 |
| 3,904,269 | 9/1975 | Lebduska et al. | 350/96.22 |
| 3,914,015 | 10/1975 | McCartney | 350/96.22 |
| 3,944,328 | 3/1976 | Kent et al. | 350/96.21 |
| 4,261,644 | 4/1981 | Giannaris | 350/96.21 |
| 4,537,468 | 8/1985 | Degoix et al. | 350/96.21 |

FOREIGN PATENT DOCUMENTS

| | | | |
|---|---|---|---|
| 53-116850 | 10/1978 | Japan | 350/96.21 |
| 55-142309 | 11/1980 | Japan | 350/96.21 |
| 57-53710 | 3/1982 | Japan | 350/96.24 |

Primary Examiner—John Lee
Attorney, Agent, or Firm—Jordan and Hamburg

[57] ABSTRACT

A connecting structure for connecting optical conductors through which light energy is transmitted. The connecting structure comprises a coupling ring of an inner diameter approximately equal to the outer diameter of the optical conductor rod, an edge surface of the optical conductor rod and that of another optical conductor rod to be connected with it in the coupling ring and being arranged so as to be opposed to each other or an edge surface of the optical conductor rod and that of a large number of the optical fibers being arranged so as to be opposed to each other, the edge surfaces being connected through the use of matching oil or optical paste.

12 Claims, 4 Drawing Figures

CONNECTING STRUCTURE FOR CONNECTING OPTICAL CONDUCTORS

BACKGROUND OF THE INVENTION

The present invention relates to a connecting structure for connecting optical conductors through which light energy is transmitted.

The present applicant has previously proposed various ways to focus solar rays or artificial light rays by means of a lens or the like, in order to guide those light rays into an optical conductor, and to transmit those light rays through an optical conductor onto an optional desired place for use in illumination or for other purposes. However, in the case of utilizing solar rays, the position of the sun is changing constantly. Therefore it is necessary to let the light-receiving surface edge of the lens follow the movement of the sun in such a manner that it always guides the solar rays into the optical conductor. For this reason the lens has to be supported so as to be able to rotate at least around the vertical axis and the horizontal axis intersecting therewith.

On the other hand, light energy focused by a lens is guided into the optical conductor, the light-receiving edge of which is positioned at the focal point of the lens. Furthermore, the light energy is being transmitted through the optical conductor onto the optional desired place where the light energy will be employed. At that time the relative position between the light-receiving edge of the optical conductor and the lens is constant. Therefore, when the light-receiving surface of the lens rotates following the movement of the sun, the light-receiving edge surface of the optical conductor rotates also. In the case of fixing the optical conductor at the terminal place for utilization (i. e. the light-emitting portion), it is necessary to support the optical conductor, so as to enable it to rotate around the horizontal axis and the vertical axis.

Also in the case of focusing the solar rays or the artificial light rays by means of a lens and then guiding those rays into an optical conductor, in such a manner as mentioned above, the density of the light energy in the optical conductor is very high. For this reason, on some occasions, when the energy density of the light rays transmitted through the optical conductor as mentioned above is lowered, for the purpose of utilizing those rays, the utilization efficiency thereof is increased.

Furthermore, the present applicant has previously proposed that a space craft carry a lens for focusing solar rays. In such a case, the lens for focusing is installed outside the space craft. Also solar rays, focused by a lens, are employed inside the space craft. In order to guide the solar rays properly, the optical conductor has to be installed through the external wall of the space craft. However, in the case of a space craft, the internal space thereof has to be completely shut off from the outside. There can be no exceptions about the through portion for the optical conductor with respect to what was just mentioned above.

SUMMARY OF THE INVENTION

It is a primary object of the present invention to provide a connecting structure for connecting optical conductor rods with each other.

It is another object of the present invention to provide a connecting structure for connecting an optical conductor rod and a large number of optical fibers.

It is another object of the present invention to provide a connecting structure for connecting optical conductor rods between the internal space of a space craft and the outside without allowing leakage of light.

The above-mentioned features and other advantages of the present invention will be apparent from the following detailed description which goes with the accompanying drawings.

DESCRIPTION OF THE PREFERRED EMBODIMENTS

Figure 1:
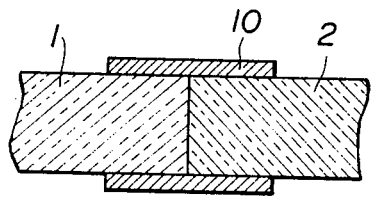
FIGS. 1 through 3 are cross-sectional construction views for explaining embodiments of the present invention.
Figure 2A:
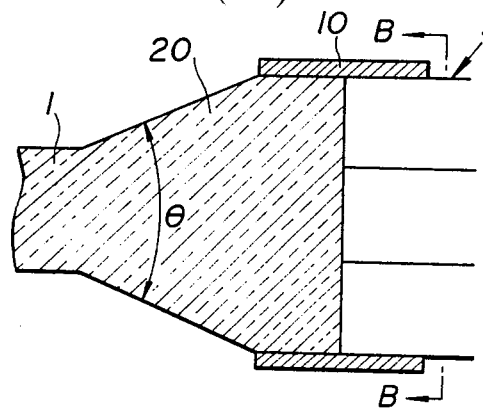
Figure 2B:
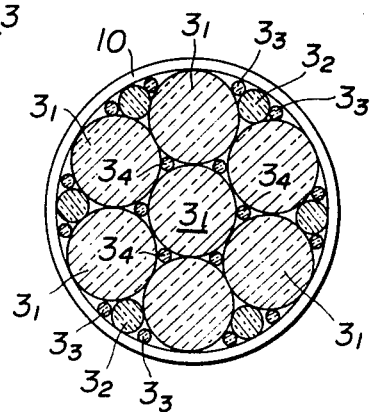

FIG. 1 is a cross-sectional view for explaining an embodiment of the present invention. In FIG. 1, 1 and 2 are optical conductor rods. The edge portion of the optical conductor rod 1 not shown in FIG. 1 is positioned at the focal point (not shown) of the lens for the purpose of focusing solar rays or artificial light rays. The light rays focused by the lens are guided into the optical conductor rod.

Then the edge portion of the optical conductor rod 2, not shown in FIG. 1, is positioned at an optional desired place. The light rays transmitted through the optical conductor rod 2 are then utilized for illumination or for other purposes. Furthermore, in FIG. 1, 10 is a coupling ring for connecting the optical conductor rods 1 and 2, as mentioned above, with each other. The inner diameter of the coupling ring 10 is approximately equal to the outer diameter of the optical conductor rods 1 and 2. In the coupling ring 10, the respective edge surfaces of the optical conductor rods 1 and 2 are arranged so as to be opposed to each other. Furthermore both of the edge surfaces are connected with each other through the use of matching oil or optical paste or the like.

However, in case that the light rays transmitted through the optical conductor rod 1 are solar rays, the optical conductor rod has to be rotated around the axis thereof. For this reason, matching oil must be employed for connecting the optical conductor rods 1 and 2. On the other hand, in the case of artificial light rays, either matching oil or optical paste can be employed.

In such a case, if the refractive index of matching oil or optical paste, employed between the optical conductor rod and the coupling ring, is smaller than that of the optical conductor rods 1 and 2, the light rays in the optical conductor rod can be prevented from leaking outside through the action of matching oil or optical paste existing in the boundary surface between the optical conductor rod and the coupling ring. Consequently, the transmission loss can be reduced to a great extent. For similar reasons, it is preferable that the refractive index of the coupling ring be smaller than that of the optical conductor rod.

Furthermore since matching oil or optical paste is placed in the space between the edge surfaces of the optical conductor rods 1 and 2, no reflection of light rays can occur at those edge surfaces. Consequently the light rays can be effectively transmitted compared with the case in which those edge surfaces are opposed to each other through an air layer. Furthermore if those edge surfaces are formed on a mirror surface, the efficiency of transmitting can be improved greatly.

Furthermore, it is desirable that the refractive index of matching oil or optical paste, interposed between the opposing surfaces of the optical conductor rod, be equal to that of the optical conductor rod. On the other hand, the refractive index of the matching oil used or of the optical paste interposed between the optical conductor rod and the coupling ring should be smaller than that of the optical conductor rod.

In the case of matching oil, since it exists in both spaces it cannot be employed indiscriminately. Matching oil having a refractive index equal to that of the optical conductor rod should be employed. In the case of the optical paste used, in the space between the opposing edge surfaces of the optical conductor rod its' refractive index should be equal to that of the optical conductor rod, and the optical paste used in the space between the optical conductor rod and the coupling ring, the refractive index should be smaller than that of the optical conductor rod. The above-mentioned illustrations indicate the preferred cases.

Although the structure for connecting the optical conductor rods with each other was described heretofore, it may also be possible to connect a single optical conductor rod with a large number of optical fibers by the use of a coupling ring. In such a case, if the optical conductor rod side is employed as a light source, the light rays transmitted through the optical conductor rod can be dispersed or diverted into a large number of optical fibers and transmitted therefrom. On the other hand, if the optical fibers' side is employed as a light source, the light rays transmitted through a large number of optical fibers can be collected by a single optical conductor rod and transmitted therethrough.

In former cases, the coupling ring was employed as a dispersing or diverting coupling, while on latter occasions, it could be employed as a collecting coupling. Furthermore, a large number of optical fibers could be connected with a large number of optical fibers by the use of the afore-mentioned coupling ring.

FIG. 2 is a cross-sectional construction view for explaining another embodiment of the present invention. More precisely, FIG. 2 (A) is a cross-sectional side view thereof and FIG. 2 (B) is a cross-sectional view taken along the section line B—B of FIG. 2 (A). In FIG. 2, 1 is an optical conductor rod through which the light energy focused by the lens is transmitted as is the case of the embodiment shown in FIG. 1, and 20 is a coupling portion for diluting or weakening the light energy which is installed at the side of the light-emitting edge portion. The coupling portion 20 can be constructed unitarily together with the optical conductor rod 1. Otherwise, it can be constructed in an independent form and connected with the optical conductor rod 1. Further, 3 is a group of optical fibers connected with the edge surface of the coupling portion 20. The optical fibers group 3 consists of various sorts of optical fibers having different diameters. By combining and banding together these optical fibers of different diameters $3_1$, $3_2$, $3_3$, . . . , the dimension of the gap between the optical fibers is decreased in order to enhance the efficiency of the optical fibers.

Moreover, in relation to the afore-mentioned combined structure of optical fibers having different diameters, its embodiment is described, in Japanese Patent Application No. 128384/1970. Such groupings of optical fibers 3 can be placed together so as to have a diameter approximately equal to that of the coupling's 20 edge surface and connected with the same edge surface by the use of optical paste or the like. Otherwise, as shown in FIG. 2, the edge surface portion of the coupling portion 20 can be inserted at the half way point within the coupling ring 10 and affixed thereto by matching oil or optical paste poured therebetween. Afterward the optical fibers can be inserted or pushed in from the opposite side, in order, into the coupling ring 10 and affixed by matching oil or optical paste.

Although the case of employing various sorts of optical fiber groupings having different diameters has been described heretofore, it is a matter of course that the optical fibers having the same diameter can also be employed in a state of banding them together. It should be easily understood that the clad layer of each optical fiber is removed at the connecting portion thereof.

According to the present invention, the light rays of high energy density, transmitted through the optical conductor rod 1, is diffused by the coupling portion 20 and diluted or weakened to the desired energy density and then guided into the respective optical fibers for utilization. The expansion angle, in the case of emitting the light rays from the optical conductor rod 1, differs more or less in accordance with the refractive index. Generally, the expansion angle is about 45°. Therefore, the expansion angle $\theta$ of the coupling portion 20 is preferably selected to the value of 45° and to a little higher angle than 45°.

On such an occasion, the relationship of the refractive index to matching oil or optical paste, the coupling ring, the optical conductor rod, the optical fibers, etc. is the same as the case shown in FIG. 1. Moreover, it is possible to use the optical fibers' side as a light source. In such a case the light rays from the respective optical fibers are condensed by the coupling portion and transmitted to the optical conductor rod.

Figure 3:
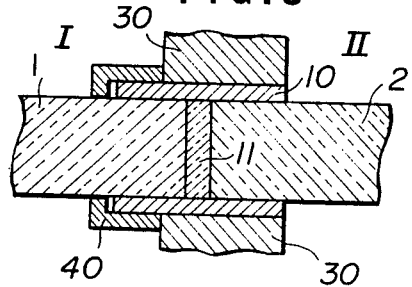

FIG. 3 is a cross-sectional view for explaining still another embodiment of the present invention. In FIG. 3, I is the space outside the space craft, II the space inside the space craft, 30 the external wall of the space craft. A lens for focusing the solar rays is mounted on the external side of the space craft. The solar rays focused by the lens are transmitted through the optical conductor rod 1 as described above.

The light rays transmitted through the optical conductor rod 1 are guided into the space craft for use in illuminating or for other purposes. The internal space of the space craft has to be shut off completely from the outside. It is difficult to have the optical conductor rod 1 pass directly through the external wall 30 of the space craft.

The present invention was created in order to settle such problems as already mentioned. As shown in FIG. 3, a coupling ring 10 is installed unitarily by passing through the external wall 30 of the space craft so as to keep it air-tight completely between the outer circumferential surface of the coupling ring 10 and the external wall of the space craft. Additionally, an interception board 11 made of a transparent material just like glass or the like is put in the coupling ring 10. The internal space of the space craft is shut off completely from the external space thereof by the use of the interception board 11. The edge surfaces of the optical conductor rods 1 and 2 are arranged opposite to each other so as to transmit the light energy from the optical conductor rod 1 to the optical conductor rod 2.

However, in the present invention, the optical conductor rods 1 and 2 are connected with the coupling ring 10 and the interception board 11 by the use of matching oil and optical paste. The relationship of the refractive index of matching oil or optical paste, the coupling ring, the optical conductor rod is the same as the cases shown in FIGS. 1 and 2. Furthermore, as in similar cases, the one side is constructed with the optical conductor rod and the other side with a large number of optical fibers. In other instances both sides are constructed with a large number of optical fibers.

The present invention can be applied to use in space. Therefore, at the external side of the space craft, since matching oil or optical paste is employed for connecting the optical conductor rod or the optical fibers with the coupling ring and the light-admitting plate as mentioned above, there is a fear of the scattering thereof in space. In order to prevent matching oil or optical paste from scattering, as shown in FIG. 3 for example, a cover member 40 is preferably installed at the connecting portion for protecting the optical conductor rod or the optical fibers from the external side of the space craft with the coupling ring and the light-admitting plate. However, at that occasion, the cover 40 to be employed has a contact portion coming into contact with the optical conductor rod 1 which is made of a material having a refractive index smaller than that of the optical conductor rod.

As is apparent from the foregoing description, according to the present invention, light energy transmitted through an optical conductor rod can be effectively transmitted onto a optional desired place.

I claim:

1. A connecting structure for use on a space craft for connecting optical conductor means which pass through the external wall of a space craft and which transmit light rays into said space craft, comprising a coupling ring air-tightly mounted within an opening in the external wall of a space craft, a light-admitting intercepting plate of transparent material disposed at an intermediate position of the longitudinal length of said coupling ring such that said light-admitting intercepting plate completely shuts off the internal space of the space craft from the surrounding external space, an external cylindrical optical conductor means having an end portion disposed in one end of said coupling ring, an internal cylindrical optical conductor means having an end portion disposed in the other end of said coupling ring, said end portions of said external and internal cylindrical optical conductor means each having an outer diameter approximately equal to the inner diameter of said coupling ring, said end portions of said external and internal optical conductor means each having a longitudinal end surface opposed to one another and juxtaposed to said light-admitting intercepting plate, matching oil or optical paste connecting said end surfaces with said light-admitting intercepting plate, said external cylindrical optical conductor means having a coupling portion extending from said end portion of said external cylindrical optical conductor means, said coupling ring having an external longitudinal end, said coupling portion being disposed externally of said longitudinal end of said coupling ring, said coupling portion having a frusto-conical configuration which increases in diameter as said longitudinal end of said coupling ring is approached such that said coupling portion diffuses and dilutes the light energy transmitted in said external cylindrical optical conductor means, whereby light rays are transmitted from the outside to the inside of said space craft via said external optical conductor means, and said coupling portion, said light-admitting intercepting plate, and said internal optical conductor means, and wherein said coupling portion diffuses and dilutes light rays of high energy density transmitted in said external cylindrical optical conductor means to a lower desired energy density to be utilized within the space craft.

2. A connecting structure according to claim 1, wherein at least one of said external and internal optical conductor means comprises an optical conductor rod.

3. A connecting structure according to claim 1, wherein at least one of said external and internal optical conductor means comprises a plurality of optical fibers of different diameters.

4. A connecting structure according to claim 1, wherein the refractive index of said matching oil or optical paste is equal to the refractive index of said external and internal optical conductor means.

5. A connecting structure according to claim 4 further comprising matching oil or optical paste connecting said external and internal optical conductor means to said coupling ring, the last said matching oil or optical paste having a refractive index less than the refractive index of said external and internal optical conductor means.

6. A connecting structure according to claim 5 further comprising a cover member disposed externally of said space craft about a portion of said coupling ring and a portion of said external optical conductor means where the latter exits from said coupling ring, said cover member contacting said external optical conductor means and said coupling ring and thereby retaining in place said first and second matching oil or optical paste, said cover member being made of a material having a refractive index less than the refractive index of said external and internal optical conductor means.

7. A connecting structure according to claim 1, wherein said light-admitting intercepting plate is made of glass, and said external and internal optical conductor means conduct light rays into said space craft for illuminating the interior of the space craft.

8. A connecting structure according to claim 1, wherein the cone angle of said frusto-conical coupling portion is about forty-five degrees.

9. A connecting structure according to claim 1, wherein the cone angle of said frusto-conical coupling portion is greater than forty-five degrees.

10. A connecting structure for use on a space craft for connecting optical conductor means which pass through the external wall of a space craft and which transmit light rays into said space craft for illuminating said space craft, comprising a coupling ring air-tightly mounted within an opening in the external wall of a space craft, a light-admitting intercepting plate of transparent material disposed at an intermediate position of the longitudinal length of said coupling ring such that said light-admitting intercepting plate completely shuts off the internal space of the space craft from the surrounding external space, an external cylindrical optical conductor means having an end portion disposed in one end of said coupling ring, an internal cylindrical optical conductor means having an end portion disposed in the other end of said coupling ring, said end portions of said external and internal cylindrical optical conductor means each having an outer diameter approximately equal to the inner diameter of said coupling ring, said end portions of said external and internal optical conductor means each having a longitudinal end surface opposed to one another and juxtaposed to said light-admitting intercepting plate, first matching oil or optical paste connecting said end surfaces with said light-admitting intercepting plate, second matching oil or optical paste connecting said end portions of said external and internal optical conductor means to said coupling ring, said first matching oil or optical paste having a refractive index equal to the refractive index of said external and internal optical conductor means, said second matching oil or optical paste having a refractive index less than the refractive index of said external and internal optical conductor means, said external cylindrical optical conductor means having a coupling portion extending from said end portion of said external cylindrical optical conductor means, said coupling ring having an external longitudinal end, said coupling portion being disposed externally of said longitudinal end of said coupling ring, said coupling portion having a frusto-conical configuration which increases in diameter as said longitudinal end of said coupling ring is approached such that said coupling portion diffuses and dilutes the light energy transmitted in said external cylindrical optical conductor means, a cover member disposed externally of said space craft about a portion of said coupling ring and a portion of said external optical conductor means, said cover member contacting said external optical conductor means and said coupling ring and thereby retaining in place said first and second matching oil or optical paste, said cover member being made of a material having a refractive index less than the refractive index of said external and internal optical conductor means, whereby light rays are transmitted from the outside to the inside of said space craft via said external optical conductor means, said coupling portion, said light-admitting intercepting plate, and said internal optical conductor means, and wherein said coupling portion diffuses and dilutes light rays of high energy density transmitted in said external cylindrical optical conductor means to a lower desired energy density to be utilized within the space craft.

11. A connecting structure according to claim 10, wherein the cone angle of said frusto-conical coupling portion is about forty-five degrees.

12. A connecting structure according to claim 10, wherein the cone angle of said frusto-conical coupling portion is greater than forty-five degrees.

* * * * *